United States Patent [19]

Okano

[11] Patent Number: 4,763,205
[45] Date of Patent: Aug. 9, 1988

[54] METHOD OF TIME AXIS CONTROL IN AN INFORMATION RECORDING SYSTEM FOR COMPENSATION OF TRACKING ERROR CAUSED BY TRACK JUMPING

[75] Inventor: Takashi Okano, Saitama, Japan

[73] Assignee: Pioneer Electronic Corporation, Tokyo, Japan

[21] Appl. No.: 767,450

[22] Filed: Aug. 20, 1985

[30] Foreign Application Priority Data

Aug. 21, 1984 [JP] Japan .................................. 59-173716

[51] Int. Cl.$^4$ .......................................... H04N 5/95
[52] U.S. Cl. .................................... 358/337; 358/338; 358/342; 358/907; 360/36.1; 360/73; 369/44
[58] Field of Search .............. 358/337, 320, 321, 322, 358/338, 342, 907, 339; 369/44–46, 32; 360/36.1, 73

[56] References Cited

U.S. PATENT DOCUMENTS

| | | | |
|---|---|---|---|
| 3,959,815 | 5/1976 | Rotter et al. ........................ | 358/338 |
| 4,123,779 | 10/1978 | Goldschmidt ...................... | 358/338 |
| 4,228,460 | 10/1980 | Rotter .............................. | 358/337 X |
| 4,286,282 | 8/1981 | Christopher et al. ............... | 358/322 |
| 4,345,279 | 8/1982 | Kimura . | |
| 4,358,796 | 11/1982 | Ceshkovsky et al. .............. | 358/322 |
| 4,422,104 | 12/1983 | Fujishima ......................... | 358/322 |
| 4,425,583 | 1/1984 | Kanamaru ......................... | 358/322 |
| 4,439,849 | 3/1984 | Nabeshima ........................ | 358/338 X |
| 4,468,709 | 8/1984 | Kenjyo ............................. | 358/322 |
| 4,603,412 | 7/1986 | Yamazaki ......................... | 358/338 X |
| 4,609,948 | 9/1986 | Okano ............................. | 358/338 |

OTHER PUBLICATIONS

"The VideoDisc Player", R. N. Rhodes, RCA Laboratories, Princeton, NJ, RCA Review, vol. 39, Mar. 1978.
Patent Abstracts of Japan, vol. 8, No. 84 (E-239) (1521), 4/84, (JP-A-595788, 1/84).
Patent Abstracts of Japan, vol. 8, No. 23 (P-251) (1460), 1/84, (JP-A-58179965, 10/83).
Patent Abstracts of Japan, vol. 7, No. 156 (P-209) (1301), 7/83, (JP-A-5864647, 4/83).
Patent Abstracts of Japan, vol. 6, No. 128 (E-118) (1006), 7/82, (JP-A-5753188, 3/82).

Primary Examiner—Raymond F. Cardillo
Assistant Examiner—W. R. Young
Attorney, Agent, or Firm—Sughrue, Mion, Zinn, Macpeak & Seas

[57] ABSTRACT

A method for time axis control for performing both coarse and fine time axis adjustment in accordance with relative speeds of a recording disk and a playback unit while the playback unit is recording or reproducing signals on or from the disk, wherein a color image is displayed during a scanning operation, which displayed image is natural in appearance. The pickup unit is first caused to follow a track formed on the recording medium in a tracking control operation. Repetitive track jumping operations are then effected over successive tracks by moving the pickup unit. For the track jumping operations, a time constant circuit within a circuit which performs the fine time axis adjustment is reset at least for the duration of each track jumping operation.

7 Claims, 5 Drawing Sheets

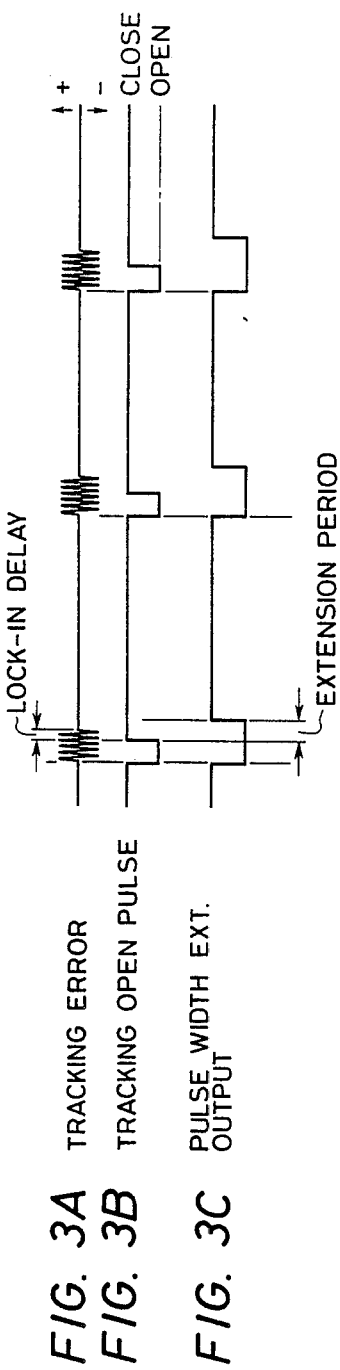
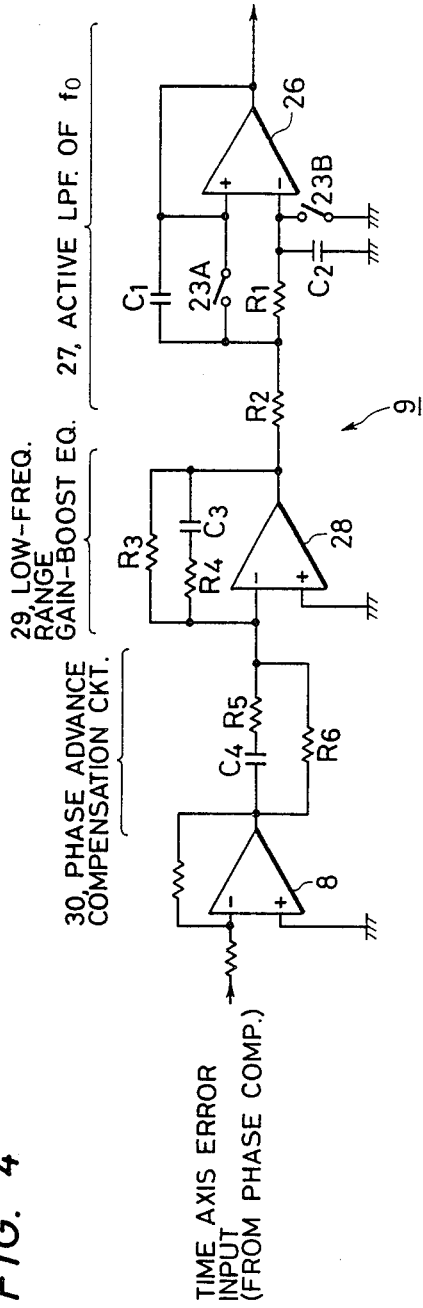
FIG. 3A TRACKING ERROR
FIG. 3B TRACKING OPEN PULSE
FIG. 3C PULSE WIDTH EXT. OUTPUT
FIG. 4

METHOD OF TIME AXIS CONTROL IN AN INFORMATION RECORDING SYSTEM FOR COMPENSATION OF TRACKING ERROR CAUSED BY TRACK JUMPING

BACKGROUND OF THE INVENTION

The present invention relates to a time axis control method which is utilized during recording or playback of data such as video signals or audio signals on or from a medium such as a disk or magnetic tape.

FIG. 1 shows an example of a method of time axis control for a video disk player. Reference numeral 1 denotes a video disk, and reference numeral 2 a spindle motor which rotates the video disk 1. A signal which is produced by a signal recording/playback unit including a pick-up (not shown in the drawings) is demodulated by a demodulator circuit 3, and the demodulated signal thus produced is transferred through a CCD (charge coupled device) 4 which serves as a fine time axis adjustment unit. Part of the resultant output signal from the CCD 4 is supplied to a circuit 5 which performs sync separation and removal of equalizing pulses to thereby produce pulses which are synchronized with the playback horizontal sync signal. These pulses are input to a phase comparator 6 and are compared in phase therein with an input signal from a reference frequency oscillator 7. The output signal from this oscillator has the same frequency as the playback horizontal sync signal (i.e., 15.734 KHz in the case of the NTSC system and 15.625 KHz in the case of the PAL system). The phase error output signal which is output from the phase comparator 6 is transferred through an amplifier 8, equalizer 9, amplifier 10, equalizer 11 and amplifier 12 to the motor 2. In addition, the output signal from the equalizer 9 is applied to a VCO (voltage-controlled oscillator) 13 to control the clock pulses which are applied to the CCD. In this way, coarse time axis control is performed by a loop including the demodulator circuit 3, CCD 4, sync separator circuit 5, phase comparator 6, amplifier 8, equalizer 9, amplifier 10, equalizer 11, amplifier 12 and motor 2. On the other hand, fine time axis control is performed by a loop comprising sync separator circuit 5, phase comparator 6, amplifier 8, equalizer 9, VCO 13 and CCD 4.

During a skip-scanning operation, in which the pick-up is alternately and successively set in a track jumping mode of operation whereby one or more tracks are skipped over, and a tracking servo mode of operation, in which the pick-up is made to follow along a track while time axis control is continued, playback of the video signal will take place during each of the intervals in which tracking occurs. Corresponding images will appear upon the monitor. Thus, such a skip-scan operation is analogous to looking up pages in a book.

In the case of a type of CAV (constant angular velocity) disk in which the positions at which the horizontal and vertical sync signals are recorded are positioned along radial lines on the disk, no problems will arise with such scanning. However, in the case of a CLV (constant linear velocity) or a type of CAV (constant angular velocity) disk in which the positions at which the horizontal and vertical sync signals are recorded do not lie along the disk radius, discontinuities will arise between the signal phase prior to a track jumping operation and the phase subsequent to that operation. Thus, each time a track jump operation takes place, a large-amplitude error signal will be produced by the time axis servo system of the disk player, and hence a relatively long time will be required before stable operation is restored. In addition, there is a danger that erroneous operation may result due to the maximum compensation range of the CCD being exceeded. For this reason, when a comparatively large-amplitude time axis error is produced, the fine time axis adjustment unit constituted by the CCD loop is placed in the off state, and only the coarse time axis adjustment unit (i.e., the spindle motor servo loop) is set in operation. As a result, color sync is lost from the displayed monitor picture, causing a black-and-white image to be displayed. A further disadvantage of this method is that, when the scanning operation is terminated and normal playing is restarted, a relatively long time must elapse before time axis control can be stabilized, that is, to reduce the time axis error to a sufficiently low value. During that time, an objectionable coloration state will appear on the monitor display.

A proposed method of overcoming the problems described above is disclosed in Japanese Pat. No. 58-98881. With that method, during a track jump operation, a hold condition is established for a frequency divider used as a counter. The hold state is implemented by a gate pulse which occurs during the interval in which a track jump operation takes place. In this way, it is proposed to ensure smooth continuity for the time axis error without disturbances occurring in the value of the error.

However, in fact, even when the technique described in the above-mentioned patent is employed, color disturbances still appear on the displayed monitor image due to disturbances of the time axis data while scanning operations are repetitively performed. This is due to the fact that, during the scanning operation, when the limit of the range of movement of the tracking mirror (which forms part of the signal recording/playback unit) is approached, a "tracking servo loop open" pulse is generated, which causes the mirror to be restored to a position close to the center of its range of movement. These "tracking servo loop open" pulses are generated in a manner which is unrelated to the period of the time axis error. Thus, when scanning operations are repetitively performed, problems will arise.

Firstly, although the time axis error is applied in a smoothly continuous fashion, the process of correction of the time axis error (commencing after each track jump operation when the CCD is reconnected) will begin from the condition existing immediately prior to that track jump, i.e., from a condition in which a certain amount of offset is contained in the error quantity.

Another problem is that the distance between the center position of a track jump and the positions at which the jump begins and ends (measured radially along the disk surface) will correspond to a substantial number of tracks. Thus, in the case of a CLV disk, the speed of rotation of the spindle motor should change by an amount which corresponds to that radial position difference. However due to the slow speed of response of the spindle motor, it is necessary for this compensation to be performed by the CCD, which has a high speed of response. When such track jump operations are performed repetitively, the offset value (the operating point deviation) will tend to accumulate and gradually increase. If this can be compensated by appropriate rotation of the spindle motor, then no problem will arise. However, if a large amount of offset is generated within a short time interval, then the spindle motor will not be able to respond with sufficient rapidity, and eventually the limit of compensation by the CCD will be reached. Loss of display color and time axis disturbances will then result.

SUMMARY OF THE INVENTION

Overcoming the disadvantages of the prior art technique, the invention provides a method of time axis control for performing both coarse and fine time axis adjustment in accordance with relative speeds of a recording medium and a signal recording/playback means while the signal recording/playback means is recording or reproducing signals on or from the recording medium, whereby a color image is displayed even when scanning is implemented for CAV or CLV disks, and the displayed images are natural in appearance.

In accordance with the inventive method, in a tracking control operation, the signal recording/playback means is first made to follow a track formed on the recording medium. Then, repetitive track jumping operations over successive tracks are effected by moving the signal recording/playback means. Time constant means within at least a circuit which performs the fine time axis adjustment is reset for the duration of each track jumping operation. The fine time axis adjustment may be carried out using CCD in which case the step of resetting the time constant is done by discharging a time constant circuit contained within the time axis control system, which includes the CCD. Moreover, the fine time axis adjustment may be performed by controlling the position of the signal recording/playback means, wherein, in the step of resetting the time constant means, the signal recording/playback means is restored to a center position.

BRIEF DESCRIPTION OF THE DRAWINGS

FIGS. 3A to 3C are waveform diagrams used for describing the device of FIG. 2;

FIG. 4 is a circuit diagram of an equalizer used in the device of FIG. 2;

DESCRIPTION OF THE PREFERRED EMBODIMENTS

Figure 1:
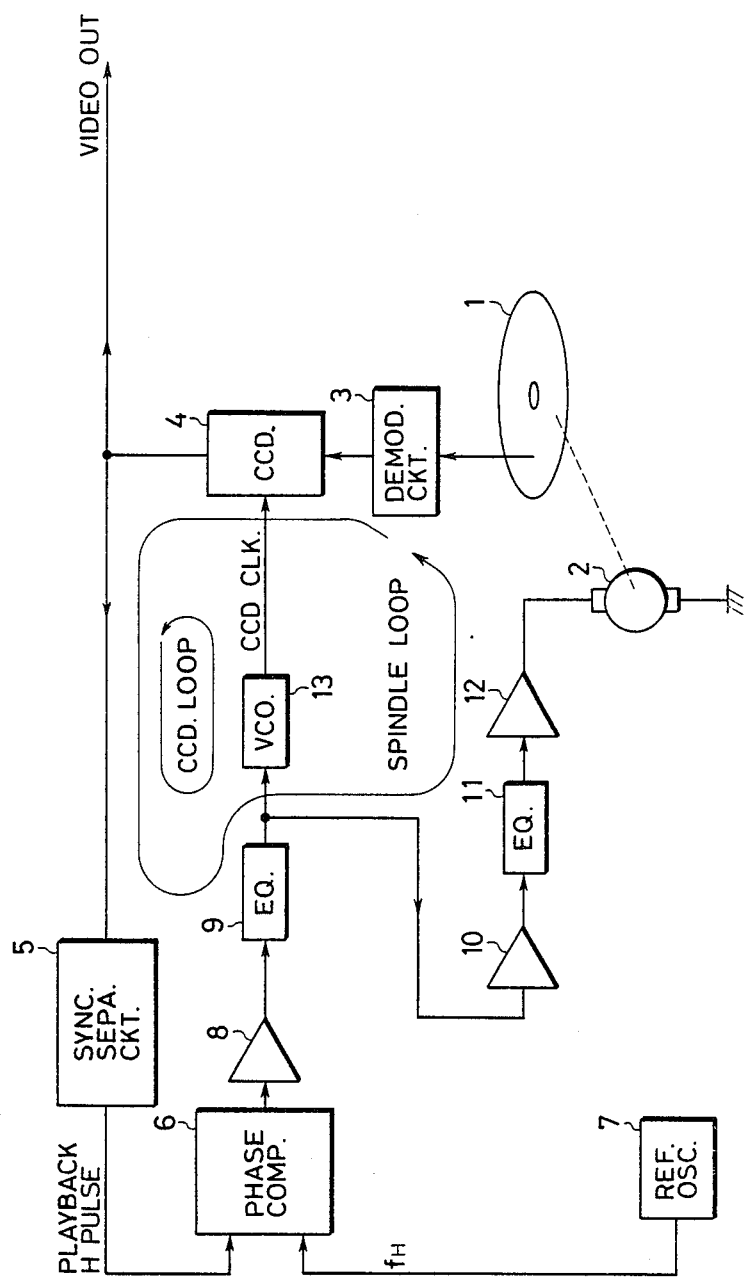
FIG. 1 is a block diagram used to illustrate a prior art method.
Figure 2:
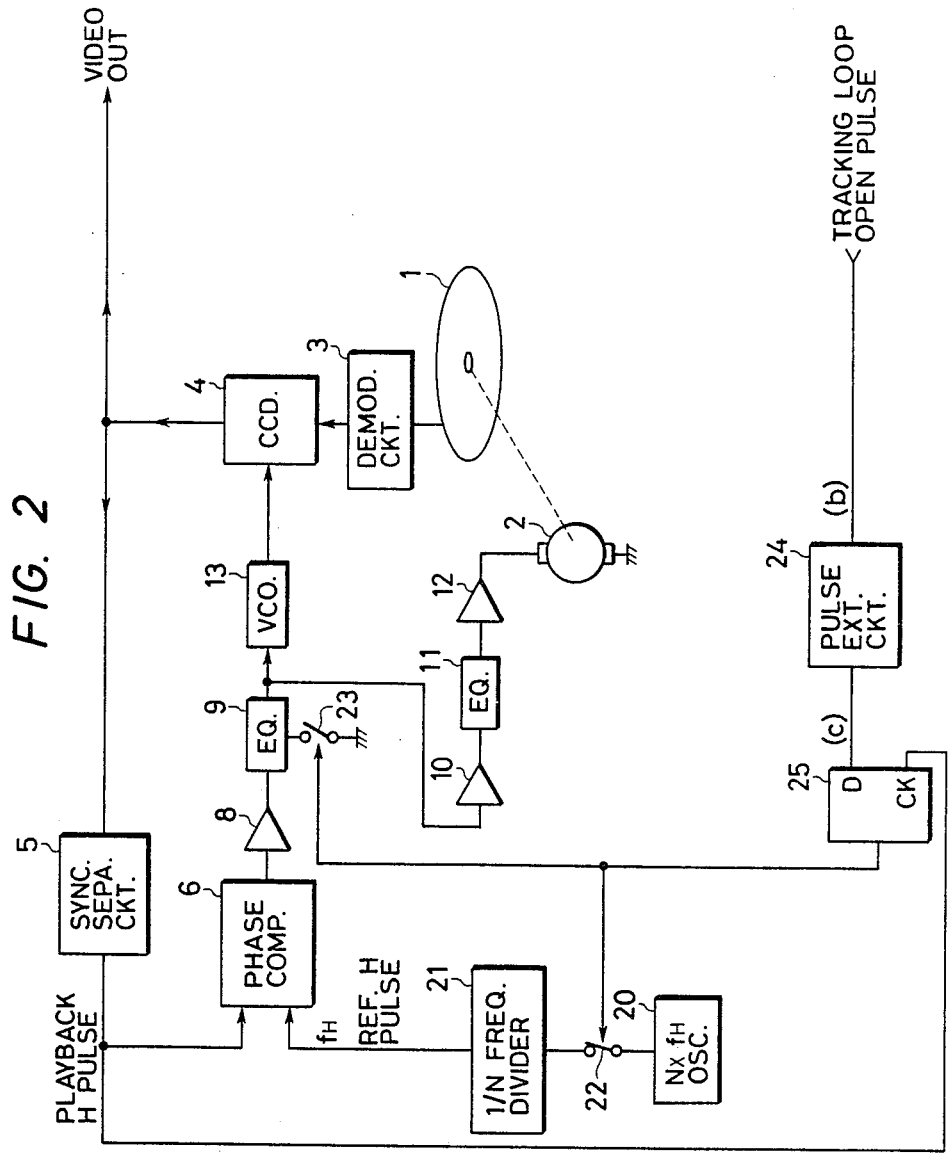
FIG. 2 is a block diagram of a time axis control device of the present invention.

FIG. 2 shows a time axis control device operating in accordance with the inventive method. Those components which correspond to components in the prior art example of FIG. 1 are indicated by corresponding reference numerals, and further description of these will be omitted hereinafter.

With the arrangement of FIG. 2, an oscillator 20, producing a reference frequency signal whose frequency is N times that of the horizontal sync signal, and a frequency divider 21, which frequency divides the latter output signal by a factor of 1/N, constitute in combination a circuit for supplying reference frequency horizontal sync pulses to the phase comparator 6. Reference numerals 22 and 23 denote switches whose opening and closing are controlled by a drive circuit formed of a pulse extension circuit 24 and a D-type flip-flop 25.

The operation of this circuit will now be described. The method of time axis control by a fine time axis adjustment system based on the CCD 4 and the coarse time axis adjustment system based on the spindle motor 2 are identical to those of FIG. 1, and therefore only the points of difference from the example of FIG. 1 will be described in the following.

The signal which is input to the pulse extension circuit 24 consists of pulses which act to set the tracking servo loop in the open state when the tracking mirror reaches a limit position of its range of movement during a servo operation (FIG. 3B). The pulse extension circuit 24 receives these pulses as an input and produces pulses of longer width as an output (FIG. 3C). When one of these "tracking servo loop open" pulses terminates, the tracking servo loop returns to the closed state. However, although switching then occurs to restore the operating condition in which the pick-up follows a disk track, the tracking servo loop will not attain a stable operating status immediately. This is due to reasons such as inertia.

The width of the pulses which are output from the pulse extension circuit 24 is determined on the basis of the time required for the system to reach a stable condition. Thus, at the time of termination of an output pulse from the pulse extension circuit 24, the tracking servo loop will have attained the locked-in status, and the tracking error will have been reduced to a sufficiently low value.

The extended-width pulses thus produced are input to the data terminal D of D-type flip-flop 25, while the playback horizontal sync pulses derived by the sync separator circuit 5 are applied to the clock terminal CK. The output signal from the D-type flip-flop 25 therefore consists of pulses each having a leading edge which occurs when the first horizontal sync pulse is applied following the initiation of generating an extended-width pulse and having a trailing edge which occurs when the first horizontal sync pulse is applied following the termination of the extended-width pulse. In this way, extended-width pulses are output from the D-type flip-flop 25 which are synchronized with the playback horizontal sync signal.

While a pulse is thus being output from D-type flip-flop 25, the switch 22 is held in the open state and the switch 23 in the closed state. When the switch 22 is opened, application of pulses from the oscillator 20 to the counter circuit constituted by the frequency divider 21 is interrupted and the current count state therein is thus held. In this way, the reference frequency horizontal sync pulses cease to be output from the frequency divider 21 during such a hold interval so that the reference frequency horizontal sync pulses cease to be input to the phase comparator 6. The output from the phase comparator 6 thereby moves in a direction such as to cause the speed of rotation of the spindle motor 2 to decrease. The closing of the switch 23 acts to discharge the time constant circuit in the equalizer 9 so that the output from the equalizer 9 becomes identical to that which would be produced during normal servo operation if the time axis error were zero. As a result, the spindle motor 2 and CCD 4 operate in the same manner as when the error signal is zero.

Upon termination of the pulse output from the D-type flip-flop 25, the switch 22 returns to the closed state. The time required to complete a track jump operation is comparatively short, and the motor 2 cannot respond with sufficient rapidity during this short time interval due to the comparatively large inertia of the motor. Thus, the speed of rotation of the spindle motor 2 immediately after a track jump operation has terminated will be almost unchanged from the speed immediately prior to the jump operation in many cases. For this reason, the phase relationship between the reference frequency horizontal sync pulses and the playback horizontal sync pulses immediately prior to a track jump operation is held as a count value, and counting is recommenced immediately after the jump operation is terminated, in synchronism with the playback horizontal sync pulses. This has the same effect as setting the phase relationship between the reference frequency horizontal sync pulses and the playback horizontal sync pulses to the same value as that existing prior to the track jump operation. In this way, continuity of the time axis error is maintained.

Up until a point in time immediately preceding a track jump operation, the time axis servo loop is held closed, and the phase error signal output from the phase comparator 6 will have a value close to zero. Setting the phase relationship between the reference frequency horizontal sync pulses and the playback horizontal sync pulses following termination of a track jump operation to the relationship immediately prior to the jump is performed by halting counting by the 1/N counter 21, and setting or presetting the value of output from the counter 21 to be zero or close to zero as a target value for the time axis servo loop, with this setting being carried out at a point following the start of the jump operation. Thus, immediately following termination of the track jump, counting by the counter 21 is restarted from a value which represents a phase difference close to zero, with counting being performed in synchronism with the playback horizontal sync pulses.

With such a method, even if drop-out occurs just before a track jump operation and an abnormal phase error signal is produced, this abnormal value will not result in any delay in operation of the servo system immediately after the track jump operation. In this way, the value which has been set into the 1/N counter 21 ensures that the phase difference between the playback horizontal sync pulses and the reference frequency horizontal sync pulses will always be close to zero immediately following a track jump operation.

As a result of termination of the output pulse from the D-type flip-flop 25, whereby the switch 23 is opened, the CCD 4 again commences to perform fine time axis adjustment based on the operating center point. Thus, no accumulation of offset (i.e., operating point deviation) will occur as a result of repetitive track jump operations being carried out. In addition, a normal time axis error signal is applied to the motor 2 as a compensation signal so that a clear color image will appear on the monitor during the track jumping operation.

FIG. 4 shows an embodiment of the equalizer 9 shown in FIG. 2. This circuit includes an active low-pass filter 27, having a cut-off frequency $f_a$, composed of capacitors $C_1$ and $C_2$, resistors $R_1$ and $R_2$, and an operational amplifier 26; a low-frequency range gain-boost equalizer 29 composed of resistors $R_3$ and $R_4$, capacitor $C_2$, and an operational amplifier 28; and a phase advance compensation circuit 30 made up of resistors $R_5$ and $R_6$ and capacitor $C_4$.

Figure 5:
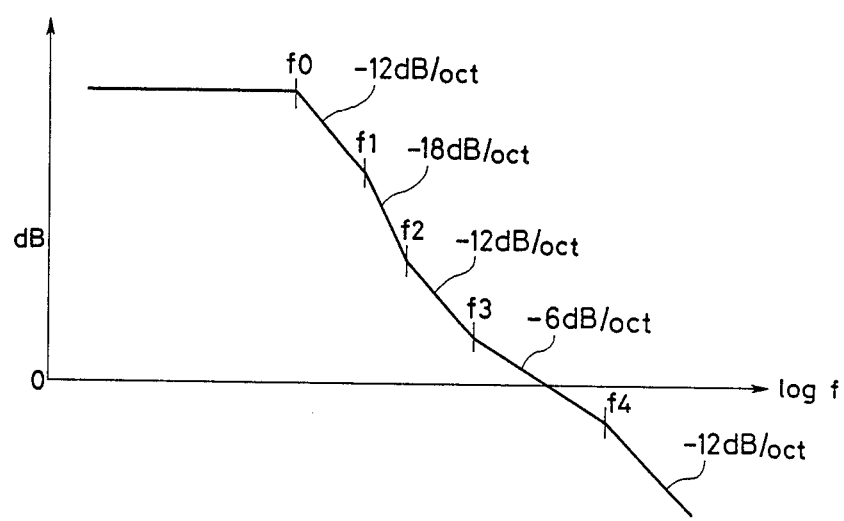
FIG. 5 shows the frequency characteristic of the circuit of FIG. 4.

The overall gain characteristic of this circuit is shown in FIG. 5. The frequencies indicated in FIG. 5 are derived as follows:

$f_0 = (\frac{1}{2\pi}) (C_1 \cdot C_2 \cdot R_1 \cdot R_2)^{\frac{1}{2}}$ $f_1 = (\frac{1}{2\pi}) (R_3 + R_4) \cdot C_3$ $f_2 = (\frac{1}{2\pi}) R_4 \cdot C_3$ $f_3 = (\frac{1}{2\pi}) (R_5 + R_6) \cdot C_4$ $f_4 = (\frac{1}{2\pi}) R_5 \cdot C_4$ When the CCD loop contains a plurality of time constant circuits as in this embodiment, then all of these can be discharged. However it is more efficient, and equally effective, to discharge only the time constant circuit which has the highest time constant value. In this embodiment, therefore, switches 23a and 23b are connected such as to short-circuit the terminals of capacitors $C_1$ and $C_2$, respectively.

Figure 6:
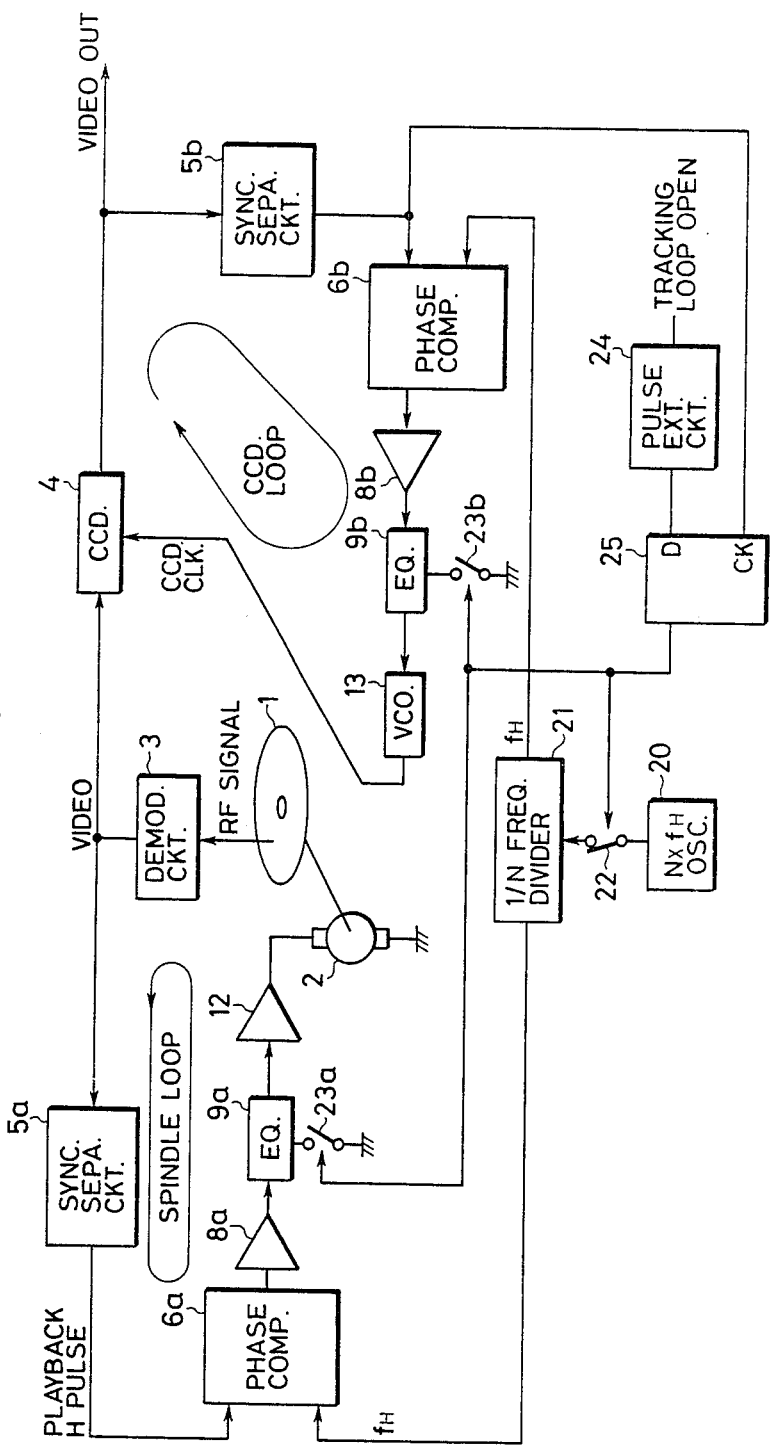
FIG. 6 is a block diagram of another time axis control device of the invention.

In the embodiment of FIG. 2, the sync separator circuit 5, phase comparator 6, amplifier 8 and equalizer 9 are used in common by both the fine adjustment loop (i.e., the CCD loop) and the coarse adjustment loop (i.e., the spindle motor loop). However in the case of the embodiment shown in FIG. 6, these two loops are kept mutually independent by providing sync separator circuits 5a and 5b, phase comparators 6a and 6b, amplifiers 8a and 8b, and equalizers 9a and 9b. It will be apparent that such an arrangement too is in accordance with the present invention. It should be noted that if the switch 23, provided for the equalizer 9a, is omitted, no problems will arise in actual operation.

Since the spindle motor 2 will generally have a comparatively large amount of inertia, it cannot respond very rapidly. Thus, if the time required to complete a track jump operation is very short, then even if no reference frequency horizontal sync pulses are output from the frequency divider (counter) 21 during the jump interval, virtually no change in the speed of rotation of the motor 2 will occur during that interval.

In the above embodiments, a CCD is employed in the fine time axis adjustment unit. However it is equally possible to employ an actuator having, for example, a tangential mirror. In this case, the actuator itself will have the highest time constant value within the loop. Since it will not be possible to perform discharging as is done in the case of an electrical time constant circuit, it will be necessary to employ some other method of resetting the fine time axis adjustment unit. This can take the form of, for example, allowing current to flow into the actuator only while the actuator has returned to its central position (the neutral position), or performing detection of the angular displacement of the actuator and passing a current through the actuator in such a direction as to pull it forcibly back to the central position of its range of angular displacement.

As described hereinabove, with the present invention, resetting of the fine time axis adjustment unit is performed when the tracking servo loop is opened during a scanning operation. This ensures that a color image is displayed even when such scanning is implemented for CAV or CLV disks in which the positions at which the horizontal sync and vertical sync signals are recorded do not lie along a disk radius. In addition, the displayed image is natural in appearance and easy to view.

I claim:

1. A method of time axis control for performing coarse time axis adjustment and fine time axis adjustment in accordance with relative speeds of a recording medium and signal recording/playback means while said signal recording/playback means is recording or reproducing signals on or from said recording medium, comprising the steps of:

in a tracking control operation, causing said signal recording/playback means to follow a track formed on said recording medium; performing coarse and fine time axis adjustment including using a time constant means;

effecting repetitive track jumping operations over successive tracks by moving said signal recording/playback means; and resetting said time constant means only for the duration of each track jumping operation.

2. The method of time axis control according to claim 1, in which said fine time axis adjustment is carried out by means of a CCD, and in which said step of resetting said time constant means comprises discharging a time constant circuit contained in a time axis control system including said CCD.

3. The method of time axis control according to claim 1, in which performing said fine time axis adjustment includes the step of controlling a position of said signal recording/playback means, and in which said step of resetting said time constant means is followed by the step of restoring said signal recording/playback means to a center position only for the duration of each track jumping operation.

4. The method of time axis control according to claim 1, wherein said step of resetting said time constant means comprises the step of resetting a counter that produces frequency-divided pulses used as reference pulses for comparing a phase of a synchronizing signal read from said recording medium.

5. The method of time axis control according to claim 4, wherein said step of resetting said time constant means further comprises resetting a time constant circuit in an equalizer circuit through which a phase comparison signal produced as a result of said phase comparing passes.

6. The method of claim 1, wherein said coarse time axis adjustment and said fine time axis adjustment are effected with circuitry, a portion of which is used for both said coarse time axis adjustment and said fine time axis adjustment.

7. The method of time axis control of claim 1, wherein said coarse time axis adjustment and said fine time axis adjustment are effected with separate circuitry.

* * * * *